United States Patent
Delville et al.

(10) Patent No.: US 11,508,025 B1
(45) Date of Patent: Nov. 22, 2022

(54) SYSTEM AND METHOD FOR UPDATING DATA FOR COMPUTING DEVICES INCLUDED IN AN AIRCRAFT

(71) Applicant: SAFRAN ELECTRONICS & DEFENSE, Paris (FR)

(72) Inventors: Denis Delville, Paris (FR); Louis Théophile Thirion, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/623,200

(22) PCT Filed: Jul. 7, 2020

(86) PCT No.: PCT/EP2020/069100
§ 371 (c)(1),
(2) Date: Dec. 27, 2021

(87) PCT Pub. No.: WO2021/005044
PCT Pub. Date: Jan. 14, 2021

(30) Foreign Application Priority Data

Jul. 8, 2019 (FR) ...................................... 1907603
Nov. 21, 2019 (FR) ...................................... 1912992

(51) Int. Cl.
*G06Q 50/26* (2012.01)
*G06F 8/65* (2018.01)
*B64D 43/00* (2006.01)

(52) U.S. Cl.
CPC ........... *G06Q 50/265* (2013.01); *B64D 43/00* (2013.01); *G06F 8/65* (2013.01)

(58) Field of Classification Search
USPC ....................................................... 717/168
See application file for complete search history.

(56) References Cited

U.S. PATENT DOCUMENTS

2004/0106404 A1* 6/2004 Gould ...................... G06F 8/60
455/431
2006/0229772 A1* 10/2006 McClary ............... G06F 21/629
701/3

(Continued)

FOREIGN PATENT DOCUMENTS

CA 2781029 A1 * 12/2012 ................ B64F 5/40
EP 3316126 A1 * 5/2018 ............... G06F 8/65

(Continued)

OTHER PUBLICATIONS

"Ranger ET PDL ARINC 615 Portable Data Loader", TechSAT Datasheet, Jan. 1, 2012, pp. 1-2, XP055033039, url:http://www.techsat.com/fileadmin/media/pdf/DataSheets.engl/TechSAT-DS-Ranger-EN.pdf.

(Continued)

*Primary Examiner* — Wei Y Zhen
*Assistant Examiner* — Clint Thatcher
(74) *Attorney, Agent, or Firm* — Oliff PLC

(57) ABSTRACT

A data updating system for computing devices included in an aircraft, wherein one computing device in a first group of computing devices is, and one other computing device in a second group of computing devices is not, when the data of the computing device is updated, liable to affect the safety of the operator carrying out the maintenance on the aircraft. The system includes a data loading device, a connection connecting the data loading device with the computing device in the second group, and a data router connected to the data loading device, the data router transferring updating data to the computing devices in the first group only when a command by an operator in the cockpit of the aircraft is detected.

11 Claims, 4 Drawing Sheets

(56) References Cited

U.S. PATENT DOCUMENTS

| | | | |
|---|---|---|---|
| 2010/0083242 A1* | 4/2010 | Altstaedt | G06F 8/65 |
| | | | 717/169 |
| 2010/0235289 A1* | 9/2010 | Frayssignes | G06Q 30/016 |
| | | | 705/304 |
| 2017/0168810 A1* | 6/2017 | Knijnenburg | G06F 8/65 |
| 2019/0384587 A1* | 12/2019 | Rao | G06F 21/572 |

FOREIGN PATENT DOCUMENTS

| | | |
|---|---|---|
| FR | 2 983 022 A1 | 5/2013 |
| FR | 3 060 792 A1 | 6/2018 |

OTHER PUBLICATIONS

Oct. 13, 2020 Search Report issued in International Patent Application No. PCT/EP2020/069100.

* cited by examiner

SYSTEM AND METHOD FOR UPDATING DATA FOR COMPUTING DEVICES INCLUDED IN AN AIRCRAFT

TECHNICAL FIELD

The present invention relates to a system and a method for updating data for computing devices included in an aircraft.

PRIOR ART

Some computing devices, also referred to as computing appliances, that equip aircraft must be updated regularly. This is for example the case with flight management systems (FMS) or flight data management systems (ACMS, standing for Aircraft Condition Monitoring Systems).

For other computing devices, the updating is not regular and is carried out only at isolated points in time.

Currently, updating the data of a computing device included in an aircraft requires the presence in the cockpit of the aircraft of an operator who controls the updating of the computing device. This is because some computing devices are liable to affect the safety of an operator carrying out maintenance on the aircraft. For example, a computing device used for controlling movable members of the aircraft such as a rudder may, when it is updated, cause the movement of the rudder and injure a maintenance operator located in proximity to the rudder.

The operator in the cockpit must visually check that all the computing devices that are to be updated are in a state not presenting any risk for the maintenance operators, for example a possible movement of a movable element of the aircraft, before proceeding with the update.

However, other computing devices such as flight data management systems or the flight management systems are not liable to affect the safety of an operator carrying out maintenance on the aircraft.

Because of safety constraints, an operator must nevertheless be present in the cockpit of the aircraft for the updating of the data of the computing devices not to be liable to affect the safety of an operator carrying out maintenance on the aircraft.

DISCLOSURE OF THE INVENTION

The presence of an operator in the cockpit, in particular for operations of updating data of computing devices that are not liable to affect the safety of an operator carrying out maintenance on the aircraft, makes updating thereof more expensive in terms of human resources and may, in certain cases, delay the updating of the data of these computing devices.

The aim of the present invention is to solve the drawbacks of the prior art by proposing a system and a method for updating data for computing devices included in an aircraft that do not routinely require the presence of an operator in the cockpit of the aircraft.

For this purpose, according to a first aspect, the invention proposes a data-updating system for computing devices included in an aircraft, at least one computing device in a first group of computing devices being, during the updating of the data of the computing device, liable to affect the safety of an operator carrying out maintenance on the aircraft and at least one other computing device in a second group of computing devices not, during the updating of the data of the computing device, being liable to affect the safety of the operator carrying out the maintenance on the aircraft, characterised in that the system is included in the aircraft and comprises a data loading device, for each computing device in the second group of computing devices, a connection connecting the data loading device with the computing device in the second group, a data router connected to the data loading device, the data router being connected to the computing devices in the first group of computing devices and transferring updating data to the computing devices in the second group only when a command by an operator present in the cockpit of the aircraft is detected, and in that the data loading device comprises:

means for receiving the updating data,
means for identifying the computing device for which the updating data are intended,
means for identifying the connection to which the updating data must be transferred,
means for transferring the updating data to the identified connection if the computing device for which the updating data are intended forms part of the second group of computing devices.

The invention also relates to a data updating method for computing devices included in an aircraft, at least one computing device in a first group of computing devices being, during the updating of the data of the computing device, liable to affect the safety of an operator carrying out maintenance on the aircraft and at least one other computing device in a second group of computing devices not, during the updating of the data of the computing device, being liable to affect the safety of the operator carrying out the maintenance on the aircraft, characterised in that the method is implemented by a data loading device of a system for updating data in the aircraft, the data loading device comprising, for each computing device in the second group of computing devices, a connection connecting the data loading device with the computing device in the second group, the data loading device being connected to a data router connected to the computing devices in the first group of computing devices and transferring updating data to the computing devices in the second group only when a command by an operator present in the cockpit of the aircraft is detected, and in that the method comprises the steps of:

receiving the updating data,
identifying the computing device for which the updating data are intended,
identifying the connection to which the updating data must be transferred,
transferring the updating data to the identified connection if the computing device for which the updating data are intended forms part of the second group of computing devices.

Thus the presence of an operator in the cockpit of the aircraft for updating data of a computing device is not routinely necessary. The updating of the computing devices in the second group can thus be implemented at a distance and within a very short period of time for a fleet of aircraft.

By connecting the data loading device to a data router itself connected to the computing devices in the first group of computing devices and by connecting the data loading device directly to the computing devices in the second group of computing devices, it is possible to avoid possible updates of data of the computing devices in the first group of computing devices being implemented without the presence of an operator in the cockpit of the aircraft.

According to a particular embodiment of the invention, the means for identifying the computing device for which the updating data are intended identify the computing device for which the updating data are intended using information included in the updating data.

According to a particular embodiment of the invention, the means for identifying the connection to which the updating data must be transferred comprise a look-up table indicating for each computing device in the second group the connection connecting the computing device to the data loading device.

Thus, by updating this table, it is possible to change the configuration of the aircraft without impact on the data loading device.

According to a particular embodiment of the invention, the updating data are received by means of a connection with an updating-data transfer device located outside the aircraft.

According to a particular embodiment of the invention, each connection connecting the data loading device with a computing device in the second group is a point-to-point connection.

Thus the solution described can be implemented by a simple wiring modification and simplifies the aeronautical certification of the aircraft.

According to a particular embodiment of the invention, each connection connecting the data loading device with a computing device of the second group is a connection in accordance with the ARINC 429, ISO/IEC 802-3 Ethernet, ARINC 664 or CAN standard.

According to a particular embodiment of the invention, each connection connecting the data loading device with a computing device in the second group connects the data loading device with the computing device by means of another data router and a point-to-point connection between the computing device and the other router.

Thus the number of computing devices in the group of computers the updating of which does not present a risk of safety for a maintenance operator can be increased.

According to a particular embodiment of the invention, the data loading device is connected to the other router by two connections, one connection for transferring the data and one connection for transferring information on configuration of the other router.

According to a particular embodiment of the invention, the information on configuration of the other data router is obtained by the loading configuration device from a data table by means of a look-up table indicating, for each computing device in the second group, the point-to-point connection connecting the computing device and the other router.

The invention also relates to the computer programs stored on an information carrier, said programs comprising instructions for implementing the previously described methods, when they are loaded into and executed by a computing system.

BRIEF DESCRIPTION OF THE DRAWINGS

The features of the invention mentioned above, as well as others, will emerge more clearly from the reading of the following description of an example embodiment, said description being made in relation to the accompanying drawings, among which:

In FIG. 1a, an aircraft 10 comprises a data updating system for computing devices $140_1$ to $140_N$, $150_1$ to $150_M$ included in the aircraft 10.

The data updating system comprises a data loading device 100a, and a data router 110 the routing function of which is controlled by a control device 120 actuated by an operator positioned in the cockpit of the aircraft 10.

Figure 1A:
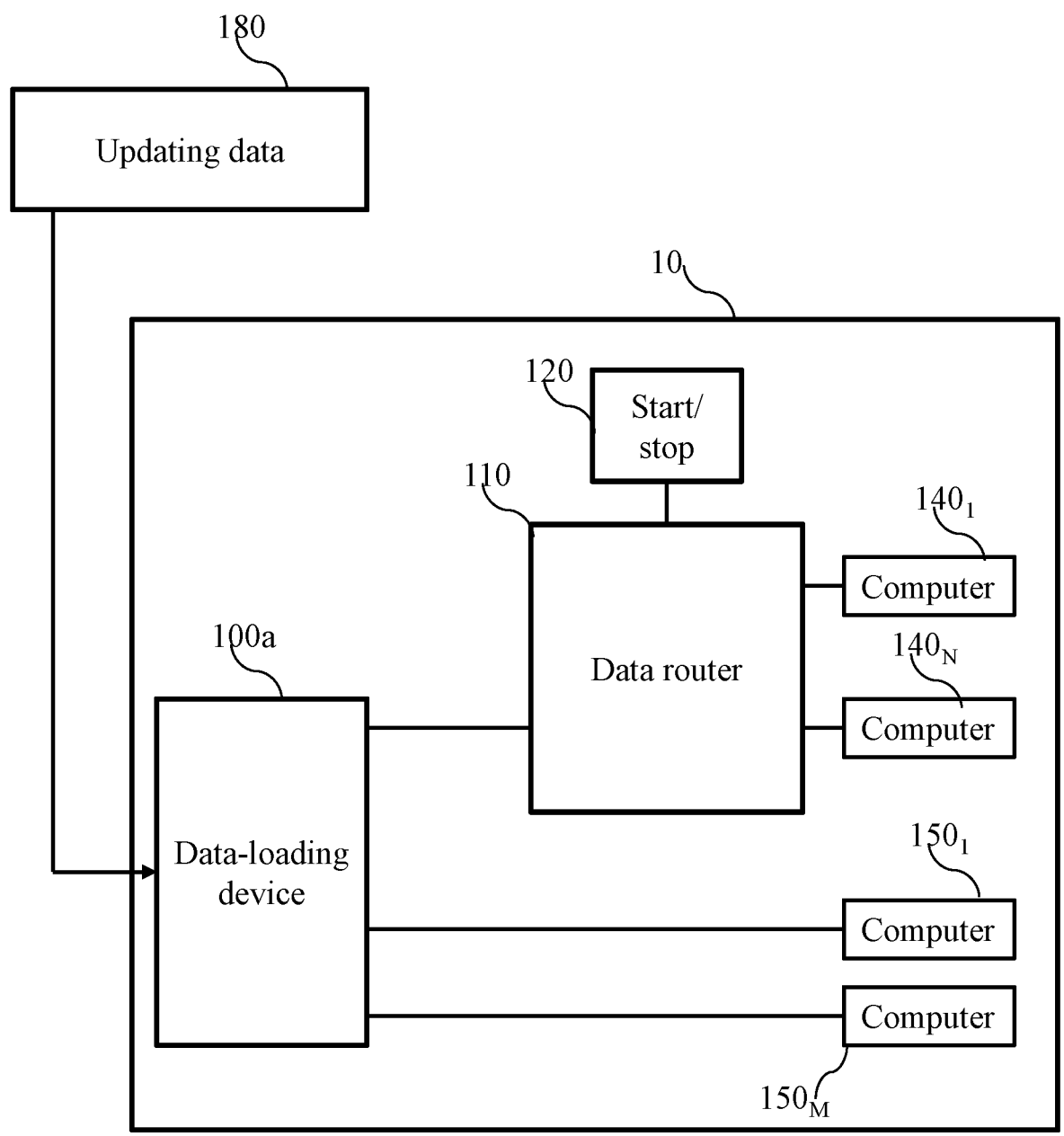
FIG. 1a shows a first example of architecture of the data updating system for computing devices included in an aircraft.

According to the present invention, the computing devices $140_1$ to $140_N$, $150_1$ to $150_M$, called computers on FIG. 1a, are distributed in a first and a second group of computing devices. The first group of computing devices comprises the computing devices $140_1$ to $140_N$ where N is greater than or equal to 1. The computing devices $140_1$ to $140_N$ in the first group of computing devices are, during the data updating thereof, all or partly liable to affect the safety of an operator carrying out maintenance on the aircraft.

The second group of computing devices comprises the computing devices $150_1$ to $150_M$ where M is greater than or equal to 1. The computing devices $150_1$ to $150_M$ in the second group of computing devices are liable to be updated in cyclic and repeated manners, and are not, during the data updating thereof, liable to affect the safety of an operator carrying out maintenance on the aircraft.

Each computing device in the first group of computing devices is connected to the data router 110 by means of connections of the ARINC 429, ISO/IEC 802-3 Ethernet, Ethernet, ARINC 664 or CAN type.

The data router 110 is connected to the data loading device 100a by means of a connection of the ARINC 429, Ethernet, ISO/IEC 802-3, ARINC 664 or CAN type. The operation of the data router 110 is activated by an operator positioned in the cockpit of the aircraft by means of a virtual or physical control button 120. Thus, as long as the operator, after having checked whether the conditions under which the aircraft is situated do not risk creating safety hazards for persons located in the aircraft or in proximity to the aircraft, has not activated the operation of the data router, no updating of the data of at least one computing device in the first group of computing devices can be implemented.

Each computing device in the second group of computing devices is directly connected to the data loading device 100a by means of connections of the ARINC 429, ISO/IEC 802-3 Ethernet, Ethernet, ARINC 664 or CAN type.

The data loading device 100a is connected by means of a cable and/or wireless network to an updating-data transfer device 180 placed outside the aircraft, for example in a local or remote maintenance centre.

When data of at least one computing device in the second group of devices must be updated, a user of the updating-data transfer device 110 demands the transfer of the updating data intended for the data downloading device 100a while identifying the computing device in the second group to which the data are transmitted.

The data downloading device 100a comprises:
means for receiving the updating data,
means for identifying the computing device for which the updating data are intended from information included in the updating data,
means for identifying a connection to which the updating data must be transferred, for example by means of a look-up table indicating, for each computing device in the second group, the connection connecting the computing device to the data loading device, means for transferring the updating data to the identified connection if the computing device for which the updating data are intended forms part of the second group of computing devices.

Figure 1B:
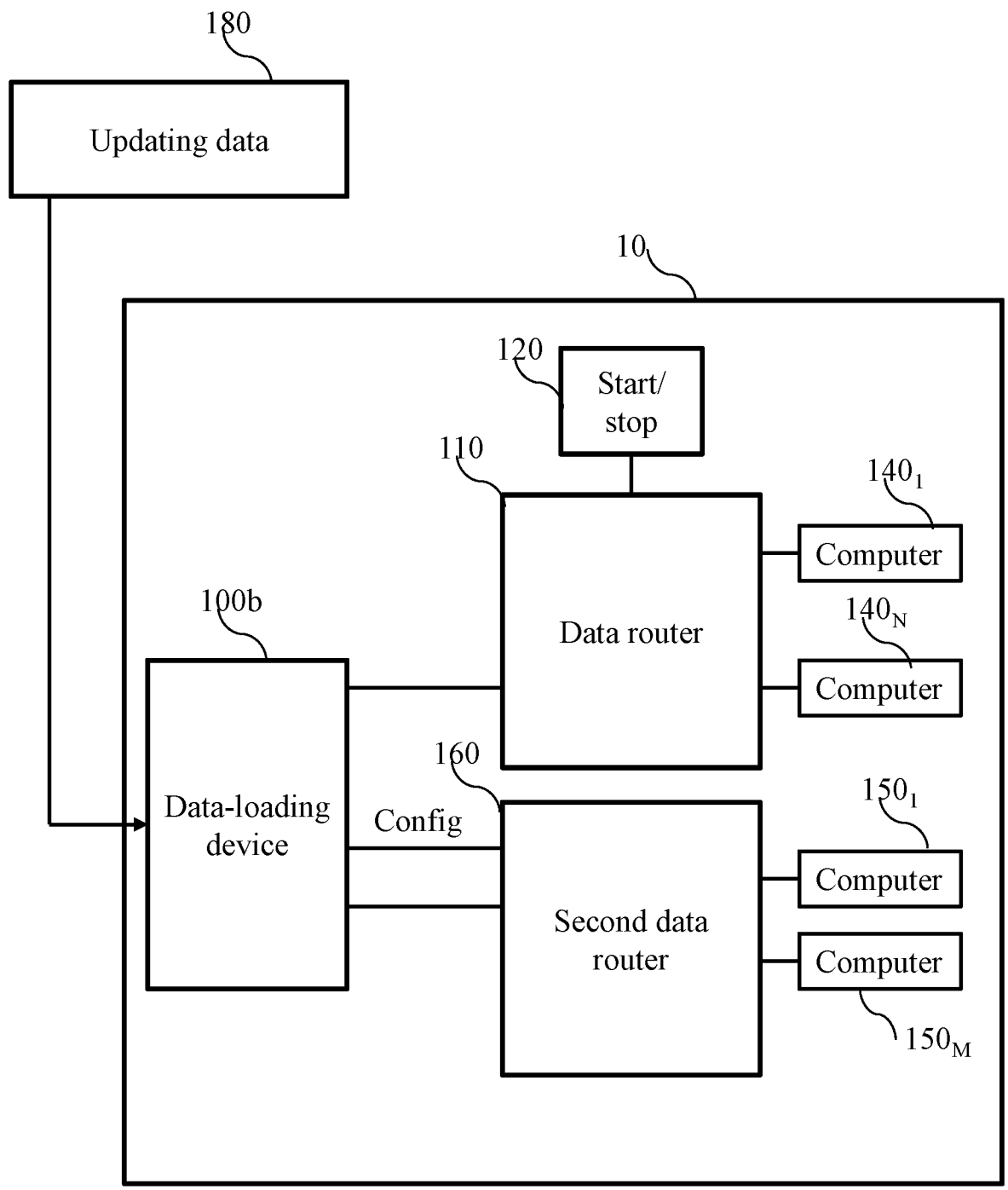
FIG. 1b shows a second example of architecture of the data updating system for computing devices included in an aircraft.

FIG. 1b shows a second example of architecture of the data updating system for computing devices included in an aircraft.

In the example in FIG. 1b, the data router 110, the control device 120, the updating-data transfer device 180 and the computing devices 140₁ to 140_N, 150₁ to 150_M are identical to those described with reference to FIG. 1a.

The data updating system comprises a data loading device 100b and a second data router 160.

Unlike the data router 110, the routing function of the second data router 160 is not controlled by an action of an operator positioned in the cockpit of the aircraft 10, it is controlled by the data loading device 100b.

The second data router 160 is connected by two connections to the data loading device 100b. A connection denoted Config in FIG. 1b is dedicated to transmitting information indicating to the second data router to which port, i.e. to which computing device in the second group of computing devices, the updating data transferred by the data loading device 100b by the other connection must be transferred.

The connections connecting the second data router and the data loading device 100b are connections of the ARINC 429, Ethernet, ISO/IEC 802-3, ARINC 664 or CAN type.

The information indicating to the second data router to which port the updating data must be transferred is called configuration data of the second router.

The configuration data of the router 160 are transmitted by the data loading device 100b using the configuration table stored in the data loading device 100b.

Each computing device in the second group of computing devices is connected to the second data router 160 by means of connections of the ARINC 429, ISO/IEC 802-3 Ethernet, Ethernet, ARINC 664 or CAN type.

Figure 2:
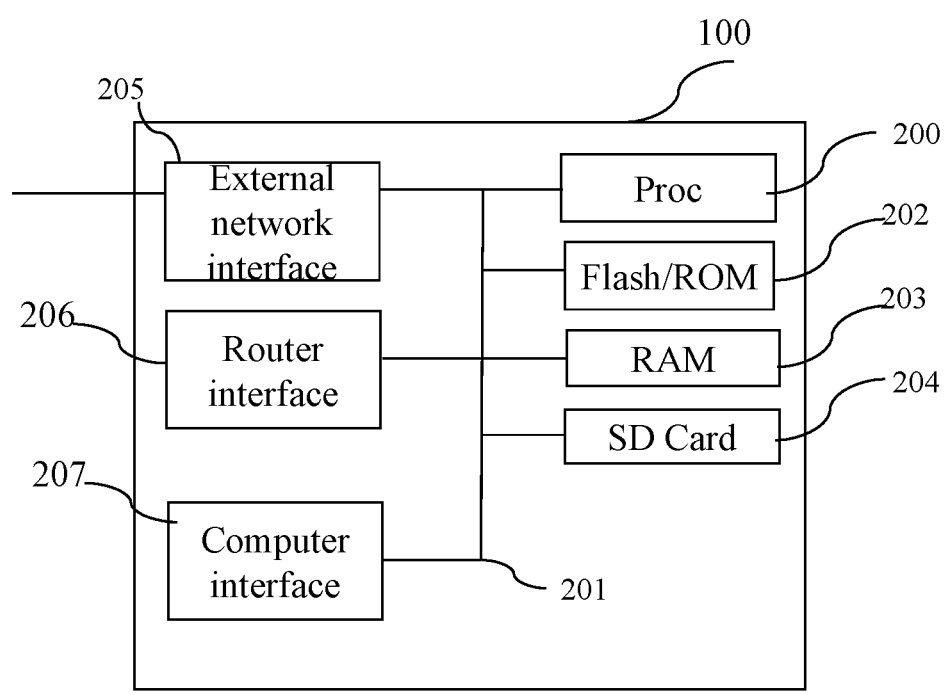
FIG. 2 shows an example of architecture of a data loading device wherein the present invention is implemented.

FIG. 2 shows an example of architecture of the data loading device wherein the present invention is implemented.

The data loading device 100a or 100b comprises:
- a processor, microprocessor or microcontroller 200;
- a volatile memory 203;
- a non-volatile memory 202;
- optionally a storage medium reader 204, such as an SD card (Secure Digital card) or a hard disk;
- an external network interface 205 for receiving data from the updating data transfer device 180;
- a connection interface 206 with the data router 110;
- a connection interface 207 with each computing device in the second group of computing devices;
- a communication bus 201 connecting the processor 200 to the ROM memory 202, to the RAM memory 203, to the storage medium reader 204 and to the interfaces 205, 206 and 207.

The processor 200 is capable of executing instructions loaded in the volatile memory 203 from the non-volatile memory 202, from an external memory (not shown), from a storage medium, such as an SD card or the like, or from a communication network.

When the data loading device is powered up, the processor 200 is capable of reading instructions from the volatile memory 203 and executing them. These instructions form a computer program that causes the implementation, by the processor 200, of all or part of the method described in relation to FIG. 3.

Figure 3:
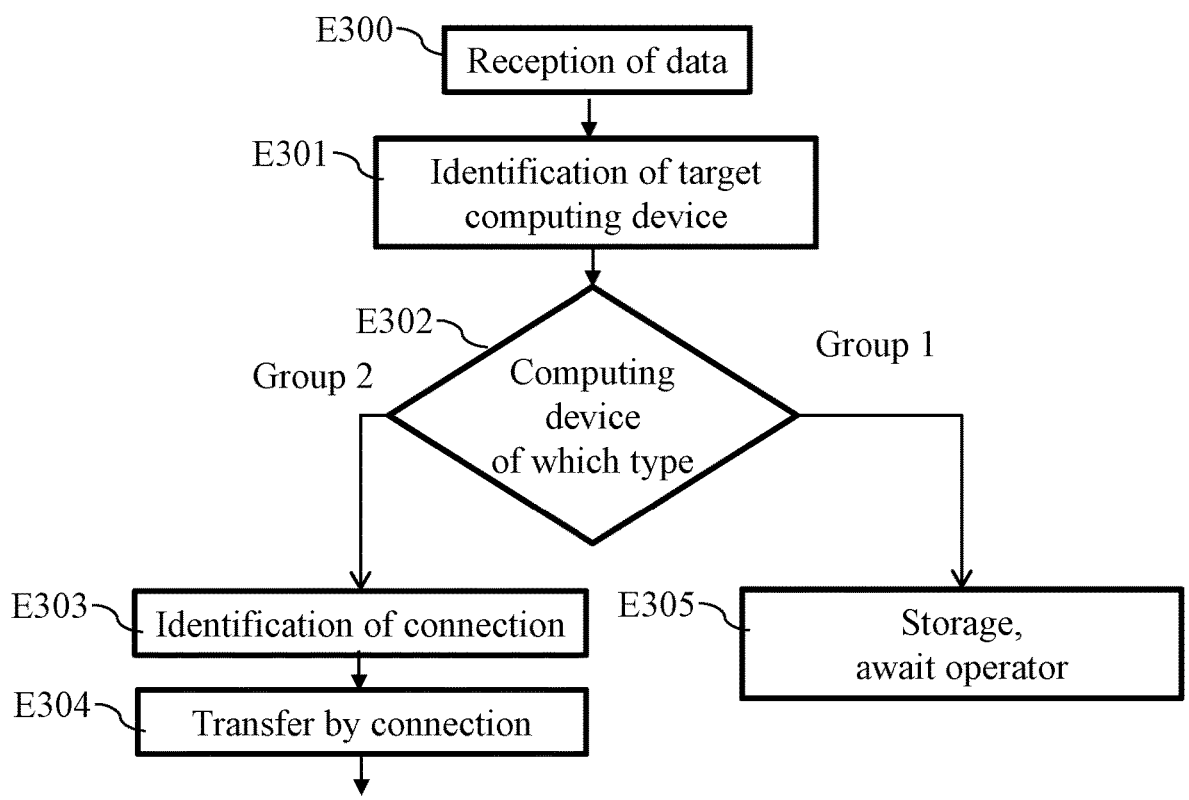
FIG. 3 shows an example of an algorithm executed by the data loading device according to the present invention.

All or part of the method described in relation to FIG. 3 can be implemented in software form by executing a set of instructions by a programmable machine, such as a DSP (digital signal processor) or a microcontroller or be implemented in hardware form by a machine or a dedicated component, such as an FPGA field programmable gate array) or an ASIC (application-specific integrated circuit).

FIG. 3 shows an example of an algorithm executed by the data loading device according to the present invention.

At the step E300, the data downloading device 100, for 100a or 100b, detects the reception of the updating data by means of the interface 205.

At the step E301, the data downloading device 100 identifies the computing device for which the updating data are intended from information included in the updating data received.

At the step E302, the data downloading device 100 determines whether the computing device for which the updating data are intended forms part of the first or of the second group of computing devices.

If the computing device for which the updating data are intended forms part of the first group of computing devices, the data downloading device 100 passes to the step E305 and stores the received data, which will be transferred only when the operation of the data router 110 is activated by an operator.

If the computing device for which the updating data are intended forms part of the second group of computing devices, the data downloading device 100 passes to the step E303 and identifies the connection to which the updating data must be transferred, for example by means of a look-up table indicating, for each computing device in the second group, the connection connecting the computing device to the data downloading device.

At the step E304, and in accordance with the first example embodiment as described in FIG. 1a, the data downloading device 100 demands the transfer of the updating data to the identified connection if the computing device for which the updating data are intended forms part of the second group of computing devices. In accordance with the second example embodiment as described in FIG. 1b, the data downloading device 100 demands the transfer of the updating data over the link connecting it to the second data router and demands the transfer by the connection denoted Config in FIG. 1b of information indicating to the second data router to which port, i.e. to which computing device in the second group of computing devices, the updating data transferred by the data downloading device 100b by the other connection must be transferred.

The invention claimed is:

1. A data-updating system for computing devices, the computing devices being included in an aircraft, at least one computing device in a first group of computing devices being, during the updating of the data of the computing device, liable to affect the safety of an operator carrying out maintenance on the aircraft and at least one other computing device in a second group of computing devices not, during the updating of the data of the computing device, being liable to affect the safety of the operator carrying out the maintenance on the aircraft, wherein the system is included in the aircraft and comprises a data loading device, for each computing device in the second group of computing devices, a connection connecting the data loading device with the computing device in the second group, a data router connected to the data loading device, the data router being connected to the computing devices in the first group of computing devices and transferring updating data to the computing devices in the second group only when a command by an operator present in the cockpit of the aircraft is detected, and in that the data loading device comprises circuitry causing the data loading device to perform:
- receiving the updating data,
- identifying the computing device for which the updating data are intended,
- identifying the connection by which the updating data must be transferred,
- transferring the updating data to the identified connection if the computing device for which the updating data are intended forms part of the second group of computing devices.

2. The system according to claim 1, wherein identifying the computing device for which the updating data are intended identifies the computing device for which the updating data are intended using information included in the updating data.

3. The system according to claim 1, wherein identifying the connection by which the updating data must be transferred comprises a look-up table indicating for each computing device in the second group the connection connecting the computing device to the data loading device.

4. A system according to claim 1, wherein the updating data are received by means of a connection with an updating-data transfer device located outside the aircraft.

5. The system according to claim 1, wherein each connection connecting the data loading device with a computing device in the second group is a point-to-point connection.

6. The system according to claim 5, wherein each connection connecting the data loading device with a computing device of the second group is a connection in accordance with the ARINC 429, ISO/IEC 802-3 Ethernet, ARINC 664 or CAN standard.

7. The system according to claim 1, wherein each connection connecting the data loading device with a computing device in the second group connects the data loading device with the computing device by means of another data router and a point-to-point connection between the computing device and the other router.

8. A system according to claim 7, wherein the data loading device is connected to the other router by two connections, one connection for transferring the data and one connection for transferring information on configuration of the other router.

9. The system according to claim 8, wherein the information on configuration of the other data router is obtained by the loading configuration device from a data table by means of a look-up table indicating, for each computing device in the second group, the point-to-point connection connecting the computing device and the other router.

10. A data-updating method for computing devices, the computing devices being included in an aircraft, at least one computing device in a first group of computing devices being, during the updating of the data of the computing device, liable to affect the safety of an operator carrying out maintenance on the aircraft and at least one other computing device in a second group of computing devices not, during the updating of the data of the computing device, being liable to affect the safety of the operator carrying out the maintenance on the aircraft, wherein the method is implemented by a data loading device of a system for updating data in the aircraft, the data loading device comprising, for each computing device in the second group of computing devices, a connection connecting the data loading device with the computing device in the second group, the data loading device being connected to a data router connected to the computing devices in the first group of computing devices and transferring updating data to the computing devices in the second group only when a command by an operator present in the cockpit of the aircraft is detected, and the method causes the data loading device to perform:
- receiving the updating data,
- identifying the computing device for which the updating data are intended,
- identifying the connection by which the updating data must be transferred,
- transferring the updating data over the identified connection if the computing device for which the updating data are intended forms part of the second group of computing devices.

11. A non-transitory storage medium that stores a computer program comprising instructions for implementing, by a data loading device, the method according to claim 10 when said program is executed by a processor of said data loading device.

* * * * *